June 19, 1962  J. G. PADELT ETAL  3,039,441
PHOTOGRAPHIC CAMERA
Filed May 3, 1957  2 Sheets-Sheet 2
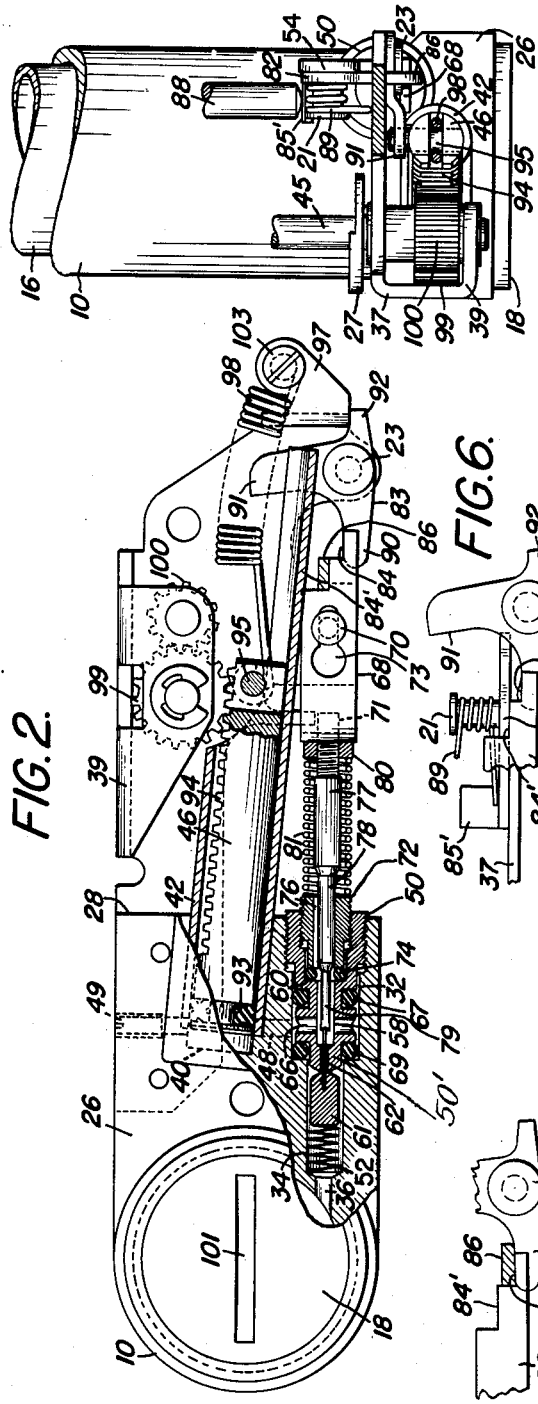
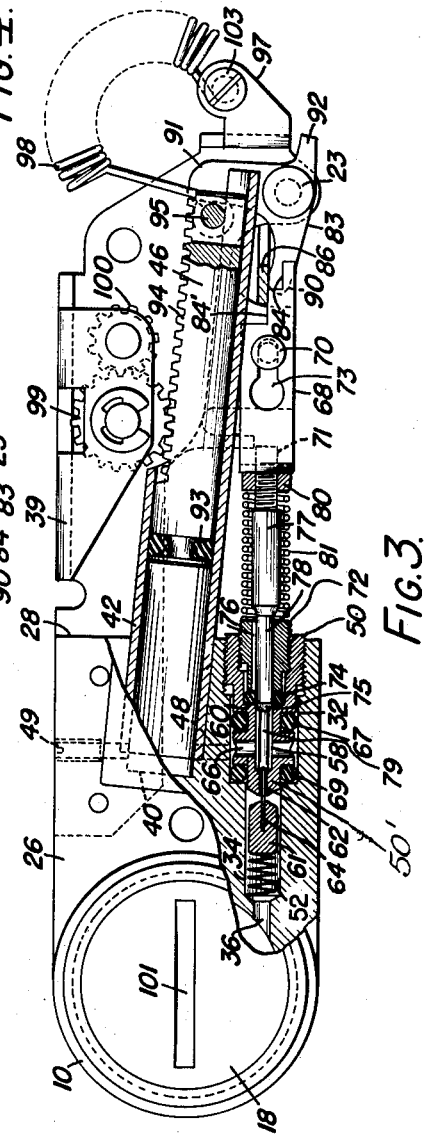
INVENTORS.
JOHANNES G. PADELT
AND ARTHUR F. HURLBURT
BY
ATTORNEY

United States Patent Office 3,039,441
Patented June 19, 1962

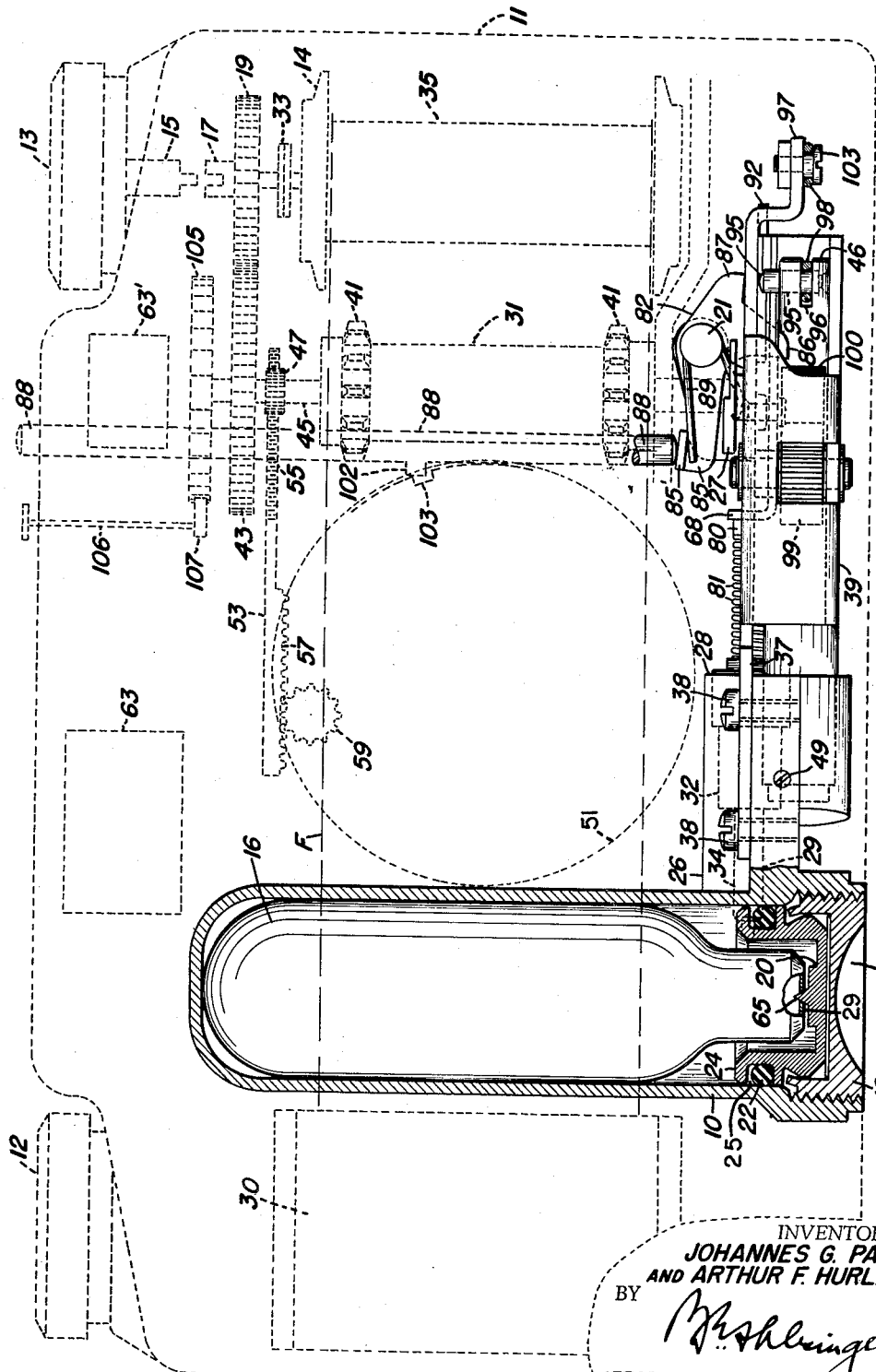

3,039,441
PHOTOGRAPHIC CAMERA
Johannes G. Padelt, Rochester, and Arthur F. Hurlburt, Fairport, N.Y., assignors to Graflex, Inc., Rochester, N.Y., a corporation of Delaware
Filed May 3, 1957, Ser. No. 656,830
9 Claims. (Cl. 121—38)

The present invention relates to photographic cameras, and more particularly to the film-transporting and shutter-cocking mechanisms for photographic cameras. In a still more specific aspect, the invention relates to film-transporting and shutter-cocking mechanism for so-called miniature or candid cameras of the general type disclosed in the Traino and Arnesen U.S. patent application Serial No. 371,053, filed July 29, 1953, now Patent No. 2,860,560, granted November 18, 1958, and assigned to the assignee of the present application.

In conventional cameras for taking still pictures, the film is transported or advanced by manually rotating a take-up spool after each picture, to move the exposed film out of, and to move unexposed film into, the exposure area of the camera. Frequently it is an inconvenience to have to rotate the take-up spool manually; and sometimes movement of the film is overlooked, so that a double exposure occurs.

One object of the present invention is to provide a photographic camera having means for automatically transporting the film after each exposure.

Another object of the invention is to provide a camera having means for automatically cocking the shutter after each exposure.

Another object of the invention is to provide a camera in which the same power means actuates both the film transport mechanism and the shutter-cocking mechanism automatically after each exposure.

Another object of the invention is to provide a camera capable of effecting a plurality of exposures in rapid succession.

Another object of the invention is to provide a camera of the character described in which the shutter will go through its full exposure cycle before the mechanism starts to advance the film.

Another object of the invention is to provide a camera of the character described in which the film-transport mechanism will not operate until the shutter has completed its cycle, regardless of the length of exposure.

Another object of the invention is to provide a film-transport unit for a camera that is powered by means of compressed air, or any other suitable compressed gas.

Another object of the invention is to provide a camera of the character described in which the film transport mechanism and/or the shutter cocking mechanism are fluid-pressure actuated from a gas cylinder contained within the camera and holding a sufficient supply of compressed actuating gas to effect any desired number of exposures, for instance, two hundred or more, without refilling or renewal.

A further object of the invention is to provide a camera of the character described in which the actuating gas is supplied from a removable cartridge or bulb that can be replaced in a few seconds by a new cartridge or bulb when its compressed gas supply is exhausted.

Still another object of the invention is to provide in a camera of the character described a power unit that will be light in weight, compact, simple and efficient in operation, and one which needs only to be tripped to perform its cycle.

Other objects of the invention will be apparent hereinafter from the specification and from the recital of the appended claims.

In the drawings:
FIG. 1 is a view looking from the rear and with the rear cover of the camera removed, and showing a power unit constructed according to one embodiment of the present invention connected to actuate the film-transport mechanism and the shutter-cocking mechanism of the camera, the camera casing and parts of the shutter-tripping, the film-transport and shutter-cocking mechanisms being shown in dotted lines, and the container, which houses the gas cartridge, being shown in section;

FIG. 2 is a bottom view of the power unit, parts thereof being broken away and shown in section, and the piston, which actuates the film-transport and shutter-cocking mechanisms being shown at the end of its return stroke;

FIG. 3 is a similar view but with the piston at the end of its power stroke;

FIG. 4 is a fragmentary end view of the unit looking from the right in FIG. 1, parts being broken away and shown in section;

FIG. 5 is a fragmentary view showing the two bell cranks and the slide which moves the valve mechanism in one direction, fragmentarily, the bell cranks being shown in a position intermediate the positions of FIGS. 2 and 3; and FIG. 6 is a fragmentary bottom view further illustrating the relation of the bell crank levers, they being shown in a position corresponding to the position of FIG. 1.

The invention is illustrated as employed in a camera using perforated film, and a toothed sprocket for metering the amount of film transported on each cycle.

In the embodiment of the invention illustrated in the drawings, the power unit for transporting the film and for cocking the shutter comprises a piston that reciprocates in a cylinder and that is connected through a rack and gearing, and a one-way clutch to the transport and metering sprocket, so as to drive the sprocket on movement of the piston in one direction on its power stroke. The sprocket is geared to the take-up spool of the camera through a friction clutch and is connected to the shutter cocking mechanism so that when the sprocket is driven, the shutter will be cocked, and the take-up spool will be rotated to take up the film.

The piston is driven on its power stroke by a compressed gas, such as compressed air, supplied to one end of the cylinder from a small, replaceable bulb or cartridge that is removably stored in the camera. This compressed air is exhausted to atmosphere from this one end of the cylinder for the return stroke of the piston. The piston is driven on its return stroke by a spring that is cocked on the power stroke of the piston.

The movement of the piston is controlled by a reciprocable valve that is constantly urged by a spring and gas pressure toward closed position, to shut off flow of the compressed air from the cartridge to the cylinder. This valve is opened against resistance of its spring and gas pressure by movement of an axially-aligned, axially-reciprocable valve rod, that is also constantly pressed by a spring in the direction to permit closure of the valve.

A bell-crank is provided to move the valve rod in the direction to open the valve. The valve rod is fixedly secured to a slide. This slide has a notch in one end. Normally the bell-crank is disposed at one side of the slide and out of registry with this notch. A release rod is provided, which, when pressed downwardly, trips the camera shutter to effect picture taking, and swings the bell-crank in one direction about its pivot until one arm registers with the notch. Then a spring, that is coiled about the pivot stud of the bell-crank, snaps this arm of the bell-crank into the notch.

The release rod is released as soon as the picture has been taken. This permits the spring to rock the bell crank in the opposite direction thereby forcing the valve rod to valve-opening position against the resistance of the gas pressure and the spring which is associated with the valve and valve rod.

The valve rod is so constructed that when it opens the valve it simultaneously closes off exhaust of gas from the cylinder to atmosphere. As soon as the valve is opened, the compressed gas flows from the bulb or cartridge into the cylinder to effect the power stroke of the piston, transporting the film and cocking the shutter. At the end of the power stroke, the piston rocks a second bell-crank which kicks the first bell-crank out of its notch. This releases the valve rod, permitting the valve spring and gas pressure to reclose the valve, and return the valve rod to its normal position. This shuts off flow of the gas to the cylinder, and opens the cylinder to atmosphere so that the gas is exhausted from the cylinder. Then the piston spring, which was cocked on the power stroke of the piston, effects the idle return stroke of the piston. The parts are now in rest position, ready for the next picture-taking cycle.

Referring now in detail to the drawings, 11 denotes the casing of the camera, 12 its manually-rotatable rewind knob, and 13 the knob for manually rotating the film take-up spool in an emergency. The knob 13 is mounted in the casing 11 to be depressible against resistance of a spring (not shown) in order to engage the male coupling member 15, which is connected to knob 13, with a female coupling member 17 which is secured to a gear 19. The gear 19 is connected by a conventional friction clutch 33 with the take-up spool 35 of the camera. This spool is rotatably mounted in conventional manner in the camera casing 11.

The automatic film transporting mechanism of the present invention is illustrated in the drawings in connection with a camera using film which has perforations along its opposite lateral edges. The film is adapted to be advanced from the film cartridge 30 by rotation of a feed sprocket 31, which operates to meter the amount of film advanced each time the film transport mechnism is actuated. The sprocket 31 is provided with two axially-spaced sets of circumferential, uniformly-spaced teeth 41 adjacent its upper and lower ends, respectively, to engage the perforations in the film, to feed the film on rotation of the sprocket. The sprocket is geared to the take-up spool 35 by meshing gears 43, 19 and the friction clutch 33. Gear 43 is secured to the upper end of the spindle 45 to which the sprocket is fastened.

The spindle 45 is connected in any suitable or conventional manner with the shutter cocking mechanism of the camera, so as to cock the shutter when the film is transported. This connection may comprise a spur pinion 47 that is secured to the shaft or spindle 45, and a rack bar 53 reciprocable longitudinally in the casing and having racks 55 and 57 at opposite ends. Rack 45 meshes with the pinion 47; and rack 57 meshes with a spur gear 59 that drives the cocking ring or other shutter cocking mechanism (not shown) of the camera.

51 denotes the opening in the front of the camera casing for the objective lens mount of the camera; and 63, 63' denote the windows of the combined viewfinder, rangefinder system of the camera.

Provided within the camera casing is a container or storage compartment 10 for a conventional cartridge 16 containing compressed air or other gas, such as carbon dioxide.

The compartment 10 is closed at its bottom by a sealing member 20, which is generally cup-shaped, and which has a skirt portion 24 that surrounds the neck of the gas cylinder 16, but is spaced radially therefrom. This skirt portion has a peripheral groove 25 in which is mounted an O-ring 22. The member 20 has a prong 65 which is disposed centrally of the bottom thereof to project upwardly when the sealing member is in place. This prong is adapted to pierce the cover 29 of the cartridge 16 to permit escape of the compressed gas from the cartridge. The sealing member 20 is held in position by a nut 18 that threads into the bottom of the compartment 10. A kerf 101 is provided in the bottom of this nut to receive a coin, or screwdriver or other tool for rotating the nut 18.

The housing or compartment 10 is formed adjacent its lower end with a laterally extending portion 26. Secured to this portion 26 by means of screws 38 is a bracket 37, which is reversely bent upon itself along one lateral edge, as denoted at 39, to provide spaced parallel bearing portions, the purpose of which will be described later.

Mounted in the laterally-extending portion 26 of the housing 10 to project laterally beyond the side 28 thereof is an open-ended tube 42, constituting a cylinder, in which there is reciprocably mounted a piston 46. This piston has a peripheral groove in it adjacent its inner end in which is mounted a rubber sealing quad-ring 93. The piston is provided along one side with rack teeth 94 which mesh with the teeth of a spur gear 99, that is journaled at opposite ends in the spaced parallel bearing portions 39 of the bracket 37. The gear 99, in turn, meshes with a spur pinion 100 that is integral with a one-way coupling member 27 through which it is connected with the film transport and metering sprocket 31. Thus, as the piston 46 moves outwardly in the tube 42, it drives the transport and metering sprocket, and through the transport and metering sprocket drives the take-up spool, to take up the film.

The piston 46 is moved outwardly on its power stroke by gas pressure. It is moved in the opposite direction on its return stroke by the negator spring 98, which is secured at one end by means of a stud 103 to a downwardly bent arm portion 97 of the bracket 37, and which is secured at its opposite end by means of a stud 95 to the outer end of the piston 46. A slot 96 is provided in the piston to receive the inner end of the spring 98.

For supply of the compressed air or other gas to the tube or cylinder 42 to effect outward movement of the piston 46 there is a port or duct 36 provided in the wall of the housing 10. This port leads from housing 10 into a chamber 34, which is of somewhat larger diameter than the port 36 (FIGS. 2 and 3). This chamber 34 in turn communicates with a still larger diameter valve chamber 32.

Threaded into the outer end of the valve chamber 32 is a valve 50, that is formed within the chamber 32 with a cross duct 66 that extends diametrally through the valve. Between this cross duct 66 and its outer end the valve is formed with a peripheral groove, in which there is mounted an O-ring 67. The valve is of reduced diameter adjacent its inner end 50' and at the opposite side of cross duct 66, to provide a second peripheral recess in which another O-ring 69 is mounted. This latter O-ring seats against the shoulder formed at the juncture of the chambers 32 and 34.

Threaded into the outer end of the valve 50 to project inwardly thereinto is a bleeder sleeve 72. This sleeve serves to seat an O-ring 74 against the shoulder 60 formed internally in the valve. The valve 50 has a bore portion 62 of very small diameter leading from its inner end outwardly. This bore portion communicates with an aligned bore portion 58 of larger diameter, and this bore portion 58 communicates, in turn, with the bore of the bleeder sleeve 72.

Mounted to reciprocate in the bore of the bleeder sleeve 72 and in the axially aligned bore 58 of the valve 50 is a valve rod 77. The portion 79 of the valve rod, which projects into bore 58, is of reduced diameter as compared with the main portion 78 of the valve rod; and the two portions are connected by a conical portion 75 which in itself constitutes a valve.

Mounted to reciprocate in the reduced diameter bore portion 62 of the valve 50 is a needle valve 64, which engages at its outer end in a concave V-shaped recess in the inner end of the valve rod 77, and which is secured at its inner end in a plug 61. The plug 61 is constantly urged toward engagement with the inner face of the valve 50 by a coil spring 52, which is interposed between the inner end of the plug 61 and the inner end of the chamber 34.

The chamber 32 of the valve 50 is connected, approximately opposite the cross duct 66, by a duct 48, with a recess 40 in lateral extension 26 that forms the inner end of cylinder 42. Duct 48 is drilled into the lateral extension 26 of housing 10, and is closed at its outer end by a plug 49 that threads into this extension. At the inner end of its movement piston 46 stops short of the inner end of recess 40 so that some space is provided between the inner end of the tube 42 and the piston in its innermost position, to permit the compressed gas to act against the inner end of the piston.

The valve rod 77 is constantly urged outwardly by a coil spring 81 which surrounds the external portion of the rod, and which is interposed between the outer face of the bleeder sleeve 72 and a nut 80 that is threaded on a threaded extension 71 of the valve rod. This threaded extension 71 threads into a slider 68, and serves to secure the valve rod rigidly to the slider. Sliding movement of the slider is limited by a stud 70 which is fixed in bracket 37 and which engages in a key slot 73 in the slider.

Opening of the valve plug 61 against the resistance of gas pressure and springs 52 and 81 is effected by counterclockwise movement of the bell crank 82 from the position shown in FIG. 1. This bell-crank is pivotally mounted by means of a stud 21 on a tang 54 (FIG. 4) which is struck up from the bracket 37. The bell-crank 82 is formed with arms 85 and 86 and with a tail 87. The arm 86 extends downwardly substantially at right angles to the arm 85, and its end normally rests along the side of the notch 84' in the slide 68, as illustrated in FIG. 3. The tail 87 of the bell-crank is adapted to engage against the upper surface of the bracket 37 to serve as a stop to limit the angular movement of the bell-crank 82 in a clockwise direction. A coil spring 89, which surrounds the stud 21, and which engages at one end against a ledge 85' (FIG. 1) on the arm 85 of the bell-crank 82 and at its opposite end against the bracket 37, serves to urge this bell-crank constantly in a clockwise direction about the stud 21, as viewed in FIG. 1, to hold the ledge or flange 85' in engagement with the shutter release rod 88. The spring 89 acts not only constantly to urge the bell-crank 82 in a clockwise direction, but also operates, when placed under tension, to urge the bell-crank axially to the right in FIG. 4.

The shutter release rod 88 may be of conventional construction to trip, on movement downwardly, the shutter-actuating mechanism of the camera. The release rod has a lug 102 at one side thereof positioned to engage and trip the shutter release member 103 as the release rod is pushed downwardly.

The slider 68 has a second notch 84 in it which is displaced laterally and longitudinally of the slider from notch 84'. When the bell-crank 82 is rocked counterclockwise about its pivot stud 21 against the resistance of spring 89 by downward movement of release rod 88, the arm 86 of the bell crank slides along the side of notch 84' (FIGS. 2, 3 and 6) until it clears this notch. Thus it snaps into notch 84 under the axial pressure exerted by spring 89. The position of arm 86 at this instant is shown in FIG. 5.

When the release rod 88 is released by the photographer, spring 89 rocks the bell crank clockwise. This causes the arm 86 of the bellcrank, which is now engaged against the lateral shoulder, that is formed on slider 68 by notch 84, to force the slider 68, valve rod 77, needle valve 62 and valve plug 61 to the left from the positions shown in FIG. 2 to the positions shown in FIG. 3. This opens up the line to permit flow of the compressed air or other gas from housing 10 through port 36, chamber 34, and ducts 62, 66, and 48 into the left hand end of cylinder 42, as viewed in FIGS. 2 and 3, forcing the piston 46 to the right, driving sprocket 31 through gearing 94, 99, 100, and one-way clutch 27, and driving take-up spool 35 through gearing 43, 19 and friction clutch 33 to transport the film, and driving the shutter cocking mechanism through gearing 47, 55, 57, 59 to cock the shutter.

To disengage the arm 86 of the bellcrank 82 from the notch 84 in slider 68 at the end of the power stroke of the piston 46, a second bellcrank 83 is provided. The bellcrank 83 (FIGS. 2 and 3) is pivotally mounted by means of a stud 23 on the bracket 37 for rotation about an axis at right angles to the axis of rotation of bellcrank 82. One arm 91 (FIGS. 2, 3 and 6) of the bellcrank 83 is positioned so that it will be struck and rocked by the pin 95, which is mounted in the outer end of the piston 46, when the piston moves on its power stroke from the position shown in FIG. 2 to that shown in FIG. 3. Another arm 90 of this bell-crank 83 is positioned to engage the arm 86 of the bell-crank 82. When pin 95 strikes arm 91 of bellcrank 83, this bellcrank will be rocked clockwise from the position shown in FIG. 5 to that shown in FIG. 3. This will kick the arm 86 of bellcrank 82 out of notch 84 in slider 68 as shown in FIG. 3. Gas pressure and springs 63 and 81 will then close valve plug 61, and through needle valve 62 and valve rod 77 will open bleeder slot 76. Supply of compressed air or gas to the cylinder 42 will then cease, and instead the left hand end (as viewed in FIGS. 2 and 3) of cylinder 42 will be put on exhaust to atmosphere through ducts 48, 66, 58 and channel or groove 76 in bleeder 72. Immediately then spring 98 will return the piston 46 from the position shown in FIG. 3 to that shown in FIG. 2. The cycle will be complete. The tail 92 of the bell-crank 83 is adapted to engage the downturned portion of the bracket 37 to limit the movement of the bell-crank 83 in a counter clockwise direction as viewed in FIG. 3.

For another picture-taking operation, the release rod 88 is again manually depressed, and the cycle proceeds as described above. On downward movement of release rod 88, the shutter is tripped; and the film-transport mechanism is triggered. As soon as the rod 88 is released by the photographer, the film-transport and shutter cocking mechanisms are actuated as above described.

To prevent retrograde movement of the transport and metering sprocket 31 and of take-up spool 35 during any return movement of piston 46, a ratchet wheel 105 and pawl 107 (FIG. 1) are provided. The ratchet wheel 105 is secured to the shaft 45 of the sprocket 31; and the pawl 107 is disposed in engagement with the teeth of the ratchet wheel so as to permit rotation of the wheel with the sprocket during film transport, but to prevent retrograde movement of the sprocket.

In an ordinary cartridge 16 there may be a sufficient charge of compressed air or other gas to complete as many as two hundred picture-taking cycles. Thus, several rolls of film may be used up before the supply of gas in cartridge 16 is exhausted. An interlock may be provided through the counter mechanism of the camera to prevent depression of release rod 88 when the gas in the cartridge 16 is used up.

After all the film F on a roll has been exposed, the film has to be rewound into the film cartridge or cassette 30 (FIG. 1) by rotation of rewind knob 12. To permit rewinding of the film, the rod 106 is rocked about its axis to disengage pawl 107 from ratchet wheel 105.

The operation of the mechanism will be understood from the preceding description, but may be briefly summed up here.

When a picture is to be taken, the release rod 88 is pushed downward, in FIG. 1, to rock the bell crank 82 counterclockwise. As the bell crank 82 is rotated, the actuating spring 89 is compressed, and the arm 86 of the bell crank 82 is moved from its at-rest position (shown in FIG. 2) in notch 84' into notch 84 of slider 68, as shown in FIG. 5. While the release rod 88 is held depressed, the bell crank 82 is held immobile, and the arm 86 is also immobile.

When the exposure has been completed, and the release rod 88 has been released, the actuating spring 89 will rotate the bell crank 82 in a clockwise direction, forcing the slider 68, valve rod 77, needle valve 62, and valve plug 61 to the left, to the positions shown in FIG. 3. As the valve rod 77 moves to the left, the portion 78 thereof in conjunction with the O-ring 74 seals off communication between the duct 58 and atmosphere. When the plug 61 is opened, compressed gas flows from the housing 10, through duct 36, chamber 34, ducts 62, 66, and 48 into cylinder 42. This forces the piston 46 to the right from the position shown in FIG. 2 to that shown in FIG. 3. As the piston travels to the right, the rack 94 rotates gear 99, which drives the film transport mechanism, and the piston return spring 98 is compressed.

As the piston approaches the end of its power stroke, the stud 95 engages the arm 91 of the bell crank 83, rocking the bell crank 83 clockwise. This causes the arm 90 of the bell crank 83 to kick the arm 86 of the bell crank 82 out of the notch 84 in the slide 68, into the notch 84' again, as shown in FIG. 3. The springs 81 and 63 thereupon expand to force the valve rod 77 and the valve plug 61 to the right.

As the valve rod 77 moves to the right, the portion 78 of the valve rod is withdrawn from engagement with the O-ring 74, to the position shown in FIG. 2, to permit exhaust of the pressure fluid from the cylinder 42 through the ducts 48, 66, and 58, and the bleeder slot 76 to atmosphere. Simultaneously, the plug 61 closes, stopping flow of gas from the housing 10.

The piston return spring 98 thereupon forces the piston 46 to the left to reset the mechanism.

While the invention has been described in connection with a preferred embodiment thereof, it will be understood that it is capable of modification. Thus, for example, while it is preferred that the compressed gas be obtained from replaceable gas cartridges, a refillable gas chamber forming a permanent part of the camera might instead be employed. Moreover, the gas chamber can be constructed so that the gas cartridge can be stored in the hollow core of a roll of film. Then, the cartridge can be inserted into the camera simultaneously with the roll of film, to insure that there will always be an adequate supply of gas under pressure.

Further, while the piston has been shown as moved in one direction by a spring, it is within the contemplation of the invention to move it in both directions by gas pressure, suitable valving, of course, then being provided for such operation.

Still further, while the piston has been described as driving the metering sprocket through gearing, it might be used instead to cock a spring which would do the work for one cycle of film transport and shutter cocking.

While the invention has been described, therefore, in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. In a camera, a cylinder, a piston reciprocable in said cylinder, spring means for moving said piston in one direction in said cylinder, a duct connecting one end of said cylinder with a source of compressed gas to move said piston in the opposite direction, valve means controlling said connection and movable between a first position in which said source is connected with said one end of said cylinder and a second position in which said connection is shut off and said one end of said cylinder is connected with atmosphere, spring means constantly urging said valve means to said first position, a movable part, means operatively connecting said piston to said part to move said part upon movement of said piston in said opposite direction, an actuating member for moving said valve means to said second position, said actuating member being normally out of operative relation to said valve means, spring means constantly urging said actuating member in one direction and adapted to be loaded upon movement of said actuating member in the opposite direction, the last-named spring means when loaded being stronger than the first-named spring means, a manually-operable member for loading said last-named spring means and simultaneously causing said actuating member to be moved into operative relation with said first-named spring means, whereby to dispose said actuating member in position so that said second-named spring means will open said valve when said manually-operable member is released, and means positioned to be actuated by said piston after a predetermined amount of movement of said piston in said opposite direction to move said actuating member to inoperative position.

2. A camera as claimed in claim 1 wherein said actuating member is a bell crank, said bell crank is mounted for pivotal movement and for reciprocation axially of its pivotal axis, said second-named spring means is a coil spring mounted about said pivotal axis and operatively connected to said bell crank to constantly urge said bell crank in one direction about its axis and in one direction along said axis, one arm of said bell crank is disposed to be engaged by said manually-operable member to move said bell crank in a direction to load said second-named spring means, and a slidable member is disposed to be engaged by the other arm of said bell crank when said bell crank is moved into operative relation with said first-named spring means, said slidable member being engaged with said valve means, whereby said coil spring actuates said slidable member, when said bell crank is in said operative relation position, to move said valve means to said first position.

3. In a camera, a fluid-pressure operated power device, a duct connecting one end of said power device with a source of fluid pressure to move said power device in one direction, a valve movable in said duct between open and closed positions for controlling flow of fluid from said source through said duct to said power device, spring means constantly urging said valve to closed position to shut off flow of fluid from said source to said power device, an actuating spring for moving said valve to open position against the resistance of said spring means, said actuating spring being stronger than said spring means, said actuating spring being normally disposed in inoperative relation to said valve, and a manually operable member for moving said actuating spring into operative relation to said valve whereby said actuating spring can open said valve against the resistance of said spring means.

4. In a camera as claimed in claim 3, means positioned to be actuated at the end of the stroke of said power device in said one direction to return said actuating spring to its normal position, thereby permitting said spring means to close said valve and to put said one end of said power device on exhaust to exhaust the pressure fluid from said one end of said power device, and means operative automatically upon placing of said one end of said power device upon exhaust to effect return movement of said power device.

5. In a camera as claimed in claim 4, wherein said automatically operative means is a spring, and the last-named spring is connected to said power device to be loaded during movement of said power device in said one direction.

6. In a camera, a fluid-pressure operated power device, a duct connecting one end of said power device with a source of fluid-pressure to cause said power device to be moved in one direction, a valve movable in said duct between open and closed positions for controlling flow of the pressure fluid from said source through said duct to said power device, spring means constantly urging said valve to closed position to shut off flow of the fluid, a rotatably and axially movable actuating member, a coil spring connected to said actuating member and constantly urging said actuating member both in one direction about its axis of rotation and in one direction axially of said axis, said coil spring being more powerful than said spring means, said actuating member being normally disposed out of operative relation to said valve and a manually-operable member for moving said actuating member about its axis against the resistance of said coil spring to a position where said coil spring shifts said actuating member axially into operative relation with said valve, said coil spring being operative, when said actuating member is in operative relation to said valve and when said manually operable member is released, to open said valve against the resistance of said spring means.

7. In a camera as claimed in claim 6, means positioned to be operated by said power device at the end of its stroke in said one direction to move said actuating member back to its normal position.

8. In a camera, a cylinder, a piston reciprocable in said cylinder, spring means connected to said piston to move said piston in one direction in said cylinder, a duct connecting one end of said cylinder with a source of fluid pressure, a valve mounted in said duct for movement between open and closed positions to control flow of the pressure fluid through said duct, said valve, when open, permitting flow of the pressure fluid into said one end of said cylinder to move said piston in the opposite direction in said cylinder against the resistance of said spring means, a first spring constantly urging said valve to closed position, a reciprocable member operatively connected to said valve and mounted on movement thereof in one direction to open said valve against the resistance of said first spring, a bell crank mounted for limited pivotal movement and formed with a pair of arms, said bell crank being normally positioned out of operative relation to said reciprocable member, a coil spring connected to said bell crank and constantly urging said bell crank both in one direction about its pivot and in one direction axially of said pivot, said coil spring when loaded being more powerful than said first spring, a manually operable member engaging one arm of said bell crank and operable to pivot said bell crank in one direction about its axis against the resistance of said coil spring to load said coil spring and to bring the second arm of said bell crank into a position where said coil spring shifts said bell crank axially to bring its other arm into operative relation with said reciprocable member whereby, upon release of said manually operable member, said other arm moves said reciprocable member in a direction to open said valve against the resistance of said first spring, and releasing means positioned to be operated by said piston after movement of said piston a predetermined distance in said opposite direction to disengage said other arm from operative relation with said reciprocable member, to permit said first spring to close said valve again.

9. In a camera as claimed in claim 8, wherein said releasing means comprises a second bell crank mounted for limited pivotal movement about an axis angularly disposed to the pivotal axis of the first-named bell crank, said second bell crank being provided with two arms, one of which is positioned to be engaged by said piston after movement of said piston a predetermined distance in said opposite direction so that said piston in its further movement in said opposite direction rocks said second bell crank about its pivot, to bring the other arm of said second bell crank into engagement with said other arm of said first-named bell crank to move said other arm of said first-named bell crank out of operative relation with said reciprocable member whereby said first spring closes said valve again.

References Cited in the file of this patent

UNITED STATES PATENTS

| | | |
|---|---|---|
| 955,296 | Tripplehorn | Apr. 19, 1910 |
| 1,158,717 | Raber | Nov. 2, 1915 |
| 1,344,997 | Emmrick | June 29, 1920 |
| 1,550,933 | Tripplehorn | Aug. 25, 1925 |
| 2,025,755 | Lyle | Dec. 31, 1935 |
| 2,107,074 | Hineline | Feb. 1, 1938 |
| 2,150,055 | Defives | Mar. 7, 1939 |
| 2,159,879 | Dewandre | May 23, 1939 |
| 2,160,818 | Becker | June 6, 1939 |
| 2,256,207 | Leitz et al. | Sept. 16, 1941 |
| 2,393,534 | Hineline | Jan. 22, 1946 |
| 2,522,849 | Taylor | Sept. 19, 1950 |
| 2,649,076 | Dupre | Aug. 18, 1953 |
| 2,657,595 | Shaff | Nov. 3, 1953 |
| 2,660,993 | Blakeslee | Dec. 1, 1953 |
| 2,779,152 | Flagiello | Jan. 29, 1957 |